United States Patent
Xu et al.

(10) Patent No.: US 12,531,459 B2
(45) Date of Patent: Jan. 20, 2026

(54) MICRO-NANO VIBRATION MAGNETIC GENERATOR

(71) Applicant: Shenzhen University, Shenzhen (CN)

(72) Inventors: Junguo Xu, Shenzhen (CN); Saima Batool, Shenzhen (CN); Dongfeng Diao, Shenzhen (CN)

(73) Assignee: Shenzhen University, Shenzhen (CN)

( * ) Notice: Subject to any disclaimer, the term of this patent is extended or adjusted under 35 U.S.C. 154(b) by 258 days.

(21) Appl. No.: 18/517,007

(22) Filed: Nov. 22, 2023

(65) Prior Publication Data

US 2024/0266926 A1    Aug. 8, 2024

(30) Foreign Application Priority Data

Feb. 2, 2023   (CN) .......................... 202310125203.2

(51) Int. Cl.
*H02K 11/30* (2016.01)
*H02K 1/06* (2006.01)

(52) U.S. Cl.
CPC .............. *H02K 11/30* (2016.01); *H02K 1/06* (2013.01)

(58) Field of Classification Search
CPC ........... H02K 1/06; H02K 11/30; H02K 35/02
See application file for complete search history.

(56) References Cited

U.S. PATENT DOCUMENTS

2022/0255465 A1 *   8/2022   Wang ....................... H02N 1/04

FOREIGN PATENT DOCUMENTS

| CN | 113659865 A | 11/2021 |
| CN | 114175490 A | 3/2022 |
| CZ | 2006571 A3 * | 4/2008 |
| SG | 11202112789 R | 12/2021 |
| WO | 2021021028 A1 | 2/2021 |

OTHER PUBLICATIONS

CZ-2006571-A3, all pages (Year: 2008).*
Wei He, et al., Magneto-Electric Hybrid Generator for Simultaneously Harvesting Vibration and Stray Magnetic Field Energy, IEEE Magnetics Letters, 2019, vol. 10.

(Continued)

*Primary Examiner* — Naishadh N Desai
(74) *Attorney, Agent, or Firm* — Bayramoglu Law Offices LLC

(57) ABSTRACT

A micro-nano vibration magnetic generator is provided. The micro-nano vibration magnetic generator includes a power generation unit and a magnetic supply unit, wherein the power generation unit includes a magnetic core, a power generation coil wound on the magnetic core and a magnetic gap set on the magnetic core, wherein the magnetic gap is used to introduce the magnetic field line of the induction magnetic supply unit into the magnetic core; the magnetic core is used to conduct the introduced magnetic field line and form a magnetic field line loop with the external magnetic field; the power generation coil is used to generate current and output when the magnetic field formed by the magnetic line inside the magnetic core changes; the magnetic supply unit, which moves relative to the power generation unit, provides a changing external magnetic field at the magnetic gap.

10 Claims, 2 Drawing Sheets

(56) References Cited

OTHER PUBLICATIONS

Zhong Lin Wang, et al., Piezoelectric Nanogenerators Based on Zinc Oxide Nanowire Arrays, Science, 2006, pp. 242-246, vol. 312.
Henry A. Sodano, et al., A Review of Power Harvesting from Vibration using Piezoelectric Materials, The Shock and Vibration Digest, 2004, pp. 197-205, vol. 36, No. 3.
Xudong Wang, et al., Direct-Current Nanogenerator Driven by Ultrasonic Waves, Science, 2007, pp. 102-105, vol. 316.
Zhong Lin Wang, Towards Self-Powered Nanosystems: From Nanogenerators to Nanopiezotronics**, Advanced Functional Materials, 2008, pp. 3553-3567, vol. 18.
Guang Zhu, et al., Flexible High-Output Nanogenerator Based on Lateral ZnO Nanowire Array, Nano Letters, 2010, pp. 3151-3155, vol. 10.

* cited by examiner

MICRO-NANO VIBRATION MAGNETIC GENERATOR

CROSS REFERENCE TO THE RELATED APPLICATIONS

This application is based upon and claims priority to Chinese Patent Application No. 202310125203.2, filed on Feb. 2, 2023, the entire contents of which are incorporated herein by reference.

TECHNICAL FIELD

The present invention relates to a magnetic generator, and in particular to a micro-nano vibration magnetic generator.

BACKGROUND

The supervision of the environment and the running state of the device is usually completed by the tiny device made of the sensor of the network node, however, because the power required by the tiny device is not large, the power supply is generally provided by the self-powered system, but the self-powered system cannot guarantee the stable supply of the power supply.

In the existing technology, the self-powered system usually uses a micro-nano energy collector, the micro-nano energy collector mainly converts the kinetic energy of mechanical motion into electrical energy through piezoelectric, frictional power generation and magnetic power generation. The current generated by the piezoelectric method is small, which is limited by the relatively small power generation per unit volume of the device; friction power generation has the disadvantage of instability of irregular discharge and other devices; magnetic power generation is realized by the rotation of magnet and coil rotor, and it is difficult to realize the miniaturization of magnetic power generation device in structure.

Therefore, the existing magnetic power generation device cannot be applied to small devices at all, and the existing technology needs to be improved and improved.

SUMMARY

In view of the shortcomings of the above existing technologies, the purpose of this invention is to provide a micro-nano vibration magnetic generator, which aims to provide a small magnetic generator to solve the problem that the magnetic generator cannot be applied to small devices.

The technical scheme of the present invention is as follows:

a micro-nano vibration magnetic generator, including a power generation unit and a magnetic supply unit, wherein the power generation unit includes a magnetic core, a power generation coil wound on the magnetic core and a magnetic gap set on the magnetic core, wherein, the magnetic gap, which is used to introduce the magnetic field line of the induction magnetic supply unit into the magnetic core;

the magnetic core, which is used to conduct the introduced magnetic field line and form a magnetic field line loop with the external magnetic field;

the power generation coil, which is used to generate current and output when the magnetic field formed by the magnetic line inside the magnetic core changes;

the magnetic supply unit, which moves relative to the power generation unit, provides a changing external magnetic field at the magnetic gap.

The micro-nano vibration magnetic generator as described above, wherein the power generation unit or the magnetic supply unit oscillates under the action of external force.

The micro-nano vibration magnetic generator as described above, wherein the magnetic supply unit includes a sloshing substrate and a magnetic layer arranged on the sloshing substrate with N-pole and S-pole interval distribution, wherein the sloshing substrate sways under the action of external force.

The micro-nano vibration magnetic generator as described above, wherein the sloshing substrate is set below the magnetic gap, and the distance from the magnetic gap is less than 10 microns.

The micro-nano vibration magnetic generator as described above, wherein the S-pole and N-pole of the magnetic layer are obtained by magnetization, and the distance between the S-pole and the N-pole is between 10 nm and 50 µm; the magnetic layer material is cobalt, cobalt alloy or barium ferrite.

The micro-nano vibration magnetic generator as described above, wherein springs are arranged at both ends of the sloshing substrate, and the springs and the magnetic core are fixed on the shell.

The micro-nano vibration magnetic generator as described above, wherein the magnetic supply unit also includes a carbon protective layer arranged on the sloshing substrate to protect the magnetic layer, and a lubricating layer is arranged on the carbon protective layer.

The micro-nano vibration magnetic generator as described above, wherein the length of the magnetic core is 10 microns to 10 centimeters, and the magnetic field change includes size change and direction change.

The micro-nano vibration magnetic generator as described above, wherein the magnetic core is made of high permeability material, which is silicon steel, ferrite, nickel-iron alloy, manganese-zinc ferrite or permalloy.

The micro-nano vibration magnetic generator as described above, wherein the magnetic core is provided with a plurality of gap fractures, the gap fracture spacing is less than 10 microns, and power generation coils are set.

Compared with the existing technology, the present invention provides a micro-nano vibration magnetic generator, including a power generation unit and a magnetic supply unit, wherein the power generation unit includes a magnetic core, a power generation coil wound on the magnetic core and a magnetic gap set on the magnetic core, wherein, the magnetic gap is used to introduce the induced magnetic field line of the magnetic supply unit into the magnetic core; the magnetic core is used to form a magnetic line circuit by passing the introduced magnetic line through the internal and external magnetic fields of the magnetic core; the power generation coil is used to generate current and output when the magnetic field formed by the magnetic line inside the magnetic core changes; the magnetic supply unit is used to provide a variable external magnetic field at the magnetic gap. The present invention provides a micro-nano vibration magnetic generator, which is a newly constructed magnetic generator. It can sense micro-nano vibration, has a very small volume, can be assembled on a small device, and can stabilize the output current.

Figure 1:
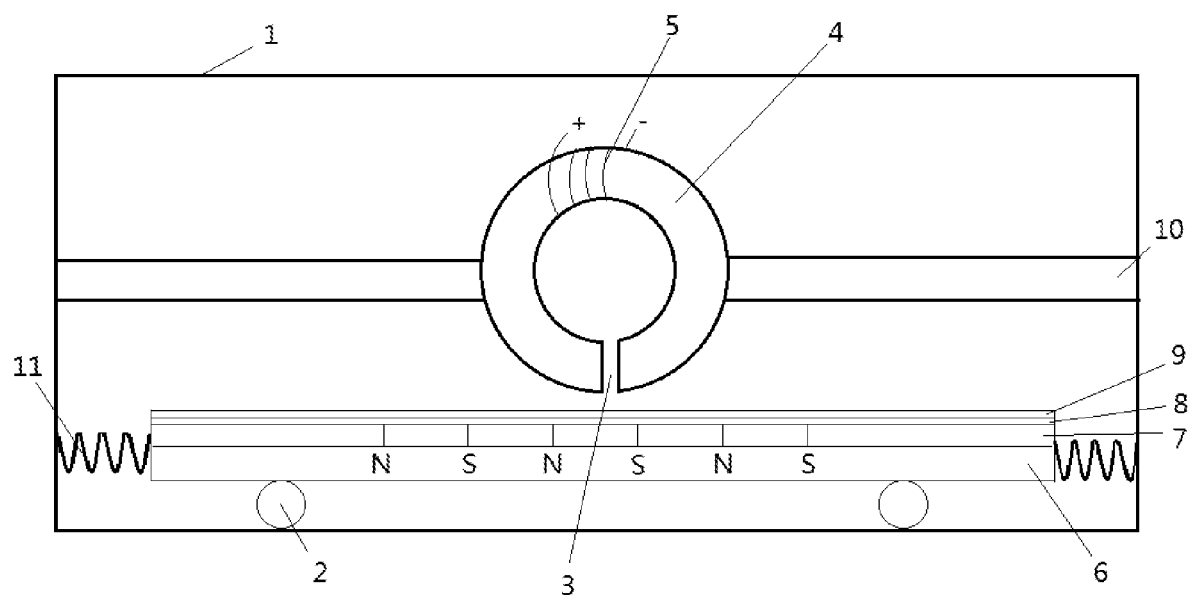
FIG. 1 is a schematic diagram of a micro-nano vibrating magnetic generator of the present invention.

Each label in the figures: 1, shell; 2. supporting rotary wheel; 3. magnetic gap; 4. magnetic core; 5, power generation coil; 6. sloshing substrate; 7. magnetic layer; 8. carbon protective layer; 9. lubrication layer; 10. fixed frame; 11, spring; 12, gap fracture.

DETAILED DESCRIPTION OF THE EMBODIMENTS

The present invention provides a micro-nano vibration magnetic generator, in order to make the purpose, technical scheme and effect of the invention more clear and definite, the following is a further detailed description of the invention with reference to the attached drawings and examples. It should be understood that the specific implementation examples described here are only used to explain the invention and are not used to limit the present invention.

The working principle of a micro-nano vibration magnetic generator of the invention is as follows: the present invention includes a power generation unit and a magnetic supply unit, the power generation unit includes a magnetic core and a power generation coil wound on the magnetic core, the magnetic core is near the head and tail to form a magnetic gap, the magnetic supply unit is used to provide a changing magnetic field at the magnetic gap, the magnetic supply unit is set below the magnetic gap, when the magnetic gap is within a certain range from the magnetic supply unit, the magnetic field magnetic line formed by the magnetic supply unit will conduct along the magnetic core, when the magnetic line conducted along the magnetic core changes, the magnetic field formed by the magnetic line inside the magnetic core will change, and the power generation coil will generate current. Micro-nano vibration is clear, refers to the micro-nano level of vibration.

References for designing the present invention include:
[1] Wang, Z. L., Song, J. H. Piezoelectric nanogenerators based on zincoxide nanowire arrays. Science. 2006, 312, 242-24;
[2] Sodano, H. A., Inman, D. J., Park, G. A review of power harvesting from vibration using piezoelectric materials. The Shock and Vibration Digest. 2004, 36, 197-205.
[3] Wang, X. D., Song, J. H., Liu, J., Wang, Z. L. Direct-current nanogenerator driven by ultrasonic waves. Science. 2007, 316, 102-105;
[4] Wang, Z. L. Towards Self-Powered Nanosystems: From Nanogenerators to Nanopiezotronics. Advanced Func-EP 3 579 290 A1 20 5 10 15 20 25 30 35 40 4550 55 tional Materials. 2008, 18, 3553-3567;
[5] Yang, R., Qin, Y., Li, C., Zhu, G., Wang, Z. L Flexible High-OutputNanogenerator Based on Lateral ZnO Nanowire Array. Nano Letters. 2009, 9, 1201-1205;
[6] Rotary friction nano-generator based on mode automatic switching and charge excitation, has main TENG with centrifugal force driving layer and excitation Teng with gear set, and main Teng connected with excitation teng through half-wave rectification bridge; CN113659865-A
Inventors: HE W; SUNK; ( . . . ); CHENG Y
Patent assignee: UNIV CHONGQING
Derwent Main preservation number 2021-D6597Y
[7] Triboelectric nanogenerator (TENG) for use in self-powered weightscale, has switch that is provided on open condition in which TE charge accumulates and closed condition in which accumulated TE charge discharges. WO2021021028-A1CN114175490-ASG11202112789-A
Inventors: WANG H; LEE C; ( . . . ); LIZ
Patent assignee: UNIV SINGAPORE NAT
Derwent main preservation number 2021-12917K
[80] He, W (He, Wei); Yang, A C (Yang, Aichao); Zhang, J T (Zhang, Jitao); Qu, C W (Qu, Chiwen), Magneto-Electric Hybrid Generator for Simultaneously Harvesting Vibration and Stray Magnetic Field Energy
IEEE MAGNETICS LETTERS, 10, 2105004, 2020-09-07

Figure 2:
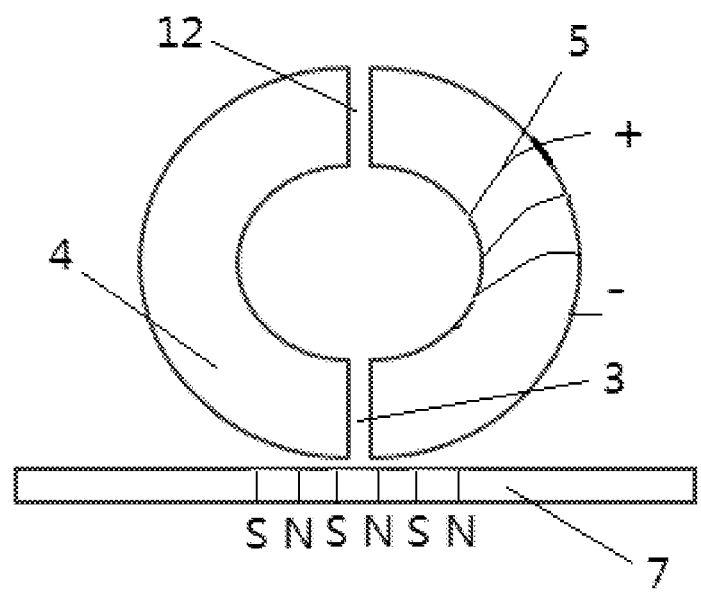
FIG. 2 is a schematic diagram of a micro-nano vibration magnetic generator with an intermission gap set in the present invention.
Figure 3:
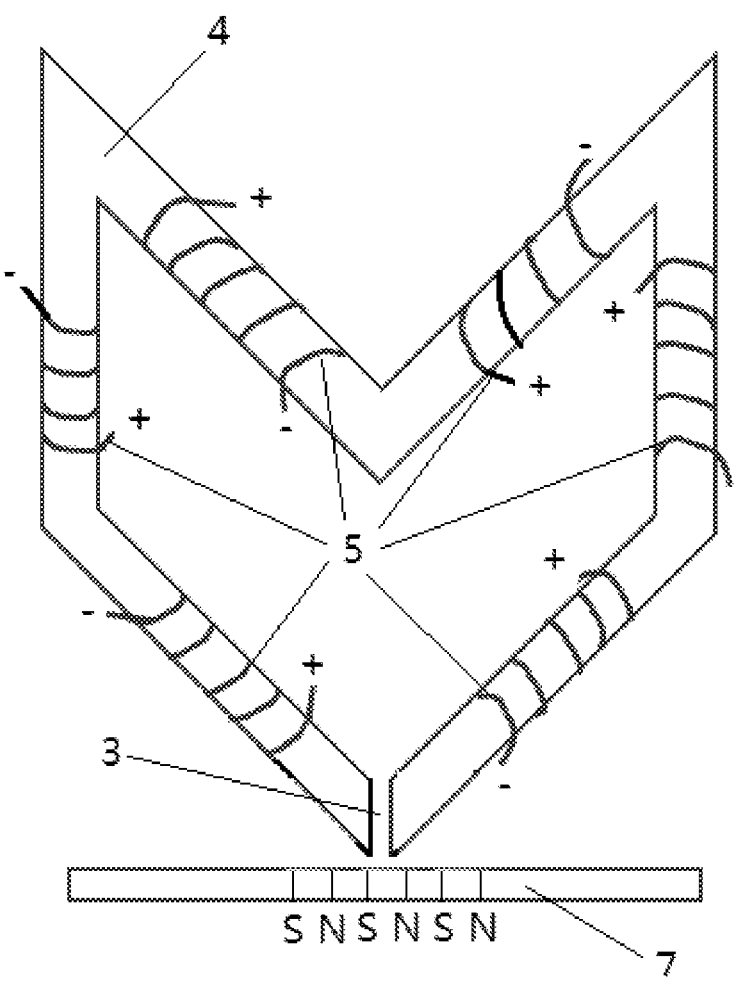
FIG. 3 is a schematic diagram of a micro-nano vibration magnetic generator with generating coils of the present invention.

See FIGS. 1-3, FIG. 1 is a schematic diagram of a micro-nano vibration magnetic generator of the present invention; FIG. 2 is a schematic diagram of a micro-nano vibration magnetic generator with a gap set in the present invention; FIG. 3 is a schematic diagram of a micro-nano vibration magnetic generator with multiple generating coils of the present invention; as shown in FIGS. 1-3, the micro-nano vibrating magnetic generator of the present invention includes a power generation unit and a magnetic supply unit, wherein the power generation unit includes a magnetic core 4, a power generation coil 5 wound on the magnetic core 4 and a magnetic gap 3 set on the magnetic core 4; wherein, the magnetic gap 3 is used to introduce the magnetic field line of the induced magnetic supply unit into the magnetic core 4; the magnetic core 4 is used to conduct the introduced magnetic line of force and the magnetic field to form a magnetic line of force loop; the power generation coil 5 is used to generate current and output when the magnetic field formed by the internal magnetic line of the magnetic core 4 changes; the relative motion of the magnetic supply unit and the power generation unit provides a variable external magnetic field at the magnetic gap 3. Specifically, the relative movement of the magnetic supply unit and the power generation unit can be the movement of the power generation unit or the movement of the magnetic supply unit, what needs to be explained here is that providing a changing magnetic field at the magnetic gap 3 does not mean that the magnetic field changes all the time, it means that the magnetic field at the magnetic gap 3 changes due to mutual movement, the fundamental reason for the change of the magnetic field is that the magnetic layer 7 with S-level and N-level interval distribution is set, the change of the magnetic field includes the change of the magnetic field intensity and the change of the magnetic field direction. The present invention provides a micro-nano vibration magnetic generator, which is a new type of magnetic generator, it can induce micro-nano vibration, and the volume is very small, can be assembled on a small device, and can stabilize the output current.

If the power generation unit is set to shake, the present invention provides a better implementation example, wherein the two ends of the power generation unit are fixed on the shell 1 through the elastic connector, which can shake under the action of external force, the magnetic supply unit is fixed on the shell 1 and cannot move relative to the shell 1.

Regarding the vibration and structure of the magnetic supply unit, the present invention provides a better implementation example, wherein when the magnetic supply unit can move, the power generation unit is fixed, and the power generation unit is fixed on the shell 1 through the fixed frame 10, the magnetic supply unit includes a sloshing substrate 6 and a magnetic layer 7 arranged on the sloshing substrate 6 with N-pole and S-pole spacing distribution, wherein the sloshing substrate 6 is sloshing under the action of external force, both ends of the sloshing substrate 6 are provided with spring 11, and the spring 11 and the magnetic core 4 are fixed on the shell 1. The sloshing substrate 6 is set on the shell 1 by spring 11, when the spring 11 deforms, the sloshing substrate 6 will move up and down left and right, in order to avoid the collision between the sloshing substrate 6 and the shell 1, the supporting rotary wheel 2 is set under the sloshing substrate 6, in order to avoid the collision between the sloshing substrate 6 and the magnetic core 4, the carbon protective layer and the lubricating layer 9 are set on the sloshing substrate 6 in turn, the carbon protective layer protects the magnetic layer 7, and the lubricating layer 9 makes it easy to slide when the sloshing substrate 6 collides with the magnetic core 4.

Regarding the distance setting between the power generation unit and the magnetic supply unit, the present invention provides a better implementation example, wherein the sloshing substrate 6 is set below the magnetic gap 3, and the distance from the magnetic gap 3 is less than 10 microns.

Regarding the setting of magnetic layer 7, the present invention provides a better implementation example, wherein the S pole and N pole of the magnetic layer 7 are obtained by magnetization, and the distance between the S pole and the N pole is between 10 nm and 50 microns; the magnetic layer 7 material is cobalt, cobalt alloy or barium ferrite. Cobalt, cobalt alloy and barium ferrite are all permanent magnetic materials, and the magnetism will not disappear after being magnetized, and the chemical formula of barium ferrite is $BaO \cdot 6Fe_2O_3$.

Regarding the setting of the magnetic core 4, the present invention provides a better embodiment, wherein the magnetic core 4 is circular, and the length of the magnetic core 4 is 10 microns to 10 centimeters, the magnetic core 4 is made of high permeability material, the high permeability material is silicon steel, ferrite, nickel iron alloy, manganese zinc ferrite or permalloy.

Regarding the magnetic core 4, the present invention provides another better implementation example, wherein the magnetic core 4 has gap fractures 12, the gap fractures 12 have a spacing of less than 10 microns, and the generator coils 5 have are set. Specifically, when the magnetic core 4 is provided with gap fractures, it must be ensured that the gap between the gap fractures 12 is less than 10 microns, which will not affect the magnetic line conduction.

In summary, the present invention provides a micro-nano vibration magnetic generator, including a power generation unit and a magnetic supply unit, wherein the power generation unit includes a magnetic core 4, a power generation coil 5 wound on the magnetic core 4, and a magnetic gap 3 set on the magnetic core 4, the magnetic gap 3 is used to introduce the magnetic line of the induced magnetic unit into the magnetic core 4; the magnetic core 4 is used to pass the introduced magnetic field line through the internal and external magnetic field of the magnetic core 4 to form a magnetic field line loop; the power generation coil 5 is used to generate current and output when the magnetic field formed by the internal magnetic line of the magnetic core 4 changes; the magnetic supply unit is used to provide a changing external magnetic field at the magnetic gap 3. The present invention provides a micro-nano vibration magnetic generator, which is a newly constructed magnetic generator, and it can sense micro-nano vibration, has a very small volume, can be assembled on a small device, and can stabilize the output current.

It should be understood that the application of the present invention is not limited to the above examples, for ordinary technicians in this field, they can be improved or transformed according to the above instructions, and all these improvements and transformations should belong to the scope of protection of the claims attached to the present invention.

What is claimed is:

1. A micro-nano vibration magnetic generator, comprising a power generation unit and a magnetic supply unit, wherein,
   the power generation unit comprises a magnetic core, a power generation coil wound on the magnetic core and a magnetic gap set on the magnetic core, wherein,
   the magnetic gap is configured to introduce a magnetic field line of the magnetic supply unit into the magnetic core;
   the magnetic core is configured to conduct the magnetic field line and form a magnetic field line loop with an external magnetic field;
   the power generation coil is configured to generate current and output when the magnetic field formed by the magnetic field line inside the magnetic core changes;
   and the magnetic supply unit moves relative to the power generation unit, provides a changing external magnetic field at the magnetic gap.

2. The micro-nano vibration magnetic generator according to claim 1, wherein the power generation unit or the magnetic supply unit oscillates under an action of external force.

3. The micro-nano vibration magnetic generator according to claim 2, wherein the magnetic supply unit comprises a sloshing substrate and a magnetic layer arranged on the sloshing substrate with N-pole and S-pole interval distribution, wherein the sloshing substrate sways under the action of external force.

4. The micro-nano vibration magnetic generator according to claim 3, wherein the sloshing substrate is set below the magnetic gap, and a distance from the magnetic gap is less than 10 microns.

5. The micro-nano vibration magnetic generator according to claim 3, wherein the S-pole and N-pole of the magnetic layer are obtained by magnetization, and a distance between the S-pole and the N-pole is between 10 nm and 50 µm; a magnetic layer material is cobalt, cobalt alloy or barium ferrite.

6. The micro-nano vibration magnetic generator according to claim 3, wherein springs are arranged at both ends of the sloshing substrate, and the springs and the magnetic core are fixed on a shell.

7. The micro-nano vibration magnetic generator according to claim 3, wherein the magnetic supply unit further comprises a carbon protective layer arranged on the sloshing substrate to protect the magnetic layer, wherein a lubricating layer is arranged on the carbon protective layer.

8. The micro-nano vibration magnetic generator according to claim 1, wherein a length of the magnetic core is 10 microns to 10 centimeters, and the magnetic field change comprises size change and direction change.

9. The micro-nano vibration magnetic generator according to claim 1, wherein the magnetic core is made of high permeability material, wherein the high permeability material comprises silicon steel, ferrite, nickel-iron alloy, manganese-zinc ferrite or permalloy.

10. The micro-nano vibration magnetic generator according to claim 1, wherein the magnetic core is provided with a plurality of gap fractures, a gap fracture spacing is less than 10 microns, and power generation coils are set.

* * * * *